(12) United States Patent
Ferguson

(10) Patent No.: US 10,016,812 B2
(45) Date of Patent: Jul. 10, 2018

(54) DEBURRING TOOL

(71) Applicant: GDE Corp., Coeur d'Alene, ID (US)

(72) Inventor: Daniel Earl Ferguson, Coeur d'Alene, ID (US)

(73) Assignee: GDE Corp., Coeur d'Alene, ID (US)

( * ) Notice: Subject to any disclaimer, the term of this patent is extended or adjusted under 35 U.S.C. 154(b) by 0 days.

(21) Appl. No.: 14/953,373

(22) Filed: Nov. 29, 2015

(65) Prior Publication Data

US 2016/0082517 A1   Mar. 24, 2016

Related U.S. Application Data

(63) Continuation of application No. PCT/US2014/040096, filed on May 29, 2014.

(60) Provisional application No. 61/956,039, filed on May 31, 2013.

(51) Int. Cl.
*B23B 51/10* (2006.01)
*B23B 5/16* (2006.01)

(52) U.S. Cl.
CPC ............ *B23B 5/167* (2013.01); *B23B 51/103* (2013.01); *B23B 2220/08* (2013.01); *B23B 2222/84* (2013.01); *Y10T 408/89* (2015.01); *Y10T 408/899* (2015.01)

(58) Field of Classification Search
CPC ..... B23B 5/167; B23B 51/101; B23B 51/103; B23B 2220/08; Y10T 408/89; Y10T 408/893; Y10T 408/899
See application file for complete search history.

(56) References Cited

U.S. PATENT DOCUMENTS

| 651,377 | A | * | 6/1900 | McDermott | ............ B23B 51/00 408/223 |
| 1,228,951 | A | * | 6/1917 | Morton | .................... B23B 51/00 15/105 |
| 2,292,581 | A | * | 8/1942 | Richardson | ............ B23G 9/004 408/211 |

(Continued)

FOREIGN PATENT DOCUMENTS

| DE | 1138916 B | * | 10/1962 | ............. B25B 5/167 |
| DE | 19644630 A1 | * | 1/1998 | ............. B23B 5/167 |

(Continued)

OTHER PUBLICATIONS

International Search Report and Written Opinion dated Sep. 10, 2014 issued in connection with PCT/US2014/40096.

(Continued)

*Primary Examiner* — Eric A Gates
(74) *Attorney, Agent, or Firm* — Corridor Law Group, P.C.

(57) ABSTRACT

A deburring tool has a hollow top portion having an interior conical surface and an exterior surface. The exterior surface of the deburring tool is preferably conical. The top portion has a plurality of flutes formed therein and extending between the interior and exterior surfaces. Each of the flutes has a cutting edge formed at the interior conical surface. In operation, rotation of the deburring tool about a longitudinal axis removes burrs projecting from bar stock contacting the interior conical surface. A method of deburring bar stock comprises: (a) rotating the deburring tool about a longitudinal axis, and (b) contacting the bar stock to the deburring tool interior conical surface.

15 Claims, 3 Drawing Sheets

(56) References Cited

U.S. PATENT DOCUMENTS

| | | | | |
|---|---|---|---|---|
| 3,020,787 | A | * | 2/1962 | Cusick .................... B23B 5/167 |
| | | | | 408/201 |
| 3,137,208 | A | | 6/1964 | Andler |
| 3,232,145 | A | * | 2/1966 | Wilson .................... B23B 5/167 |
| | | | | 144/205 |
| 3,365,773 | A | | 1/1968 | Olsen |
| 3,754,832 | A | * | 8/1973 | Stickler .................... B23B 5/167 |
| | | | | 408/207 |
| 3,875,832 | A | * | 4/1975 | Mayfield ................ B23B 5/162 |
| | | | | 144/205 |
| 4,205,493 | A | * | 6/1980 | Kim ......................... B24D 7/18 |
| | | | | 408/211 |
| 4,252,481 | A | * | 2/1981 | Krieg ..................... B23D 79/021 |
| | | | | 407/57 |
| 4,798,109 | A | * | 1/1989 | Berns ..................... B23B 5/163 |
| | | | | 408/80 |
| 4,798,503 | A | * | 1/1989 | Huju ....................... B23B 49/04 |
| | | | | 144/219 |
| 5,363,530 | A | * | 11/1994 | Dunn ..................... B08B 9/021 |
| | | | | 15/104.03 |
| 5,810,522 | A | | 9/1998 | Parker |
| 5,961,382 | A | * | 10/1999 | Stoloski .............. B27B 17/0016 |
| | | | | 451/180 |
| 6,709,206 | B1 | * | 3/2004 | Andes .................... B23B 5/168 |
| | | | | 408/188 |
| 6,835,029 | B2 | * | 12/2004 | Salzer .................... B23B 5/167 |
| | | | | 408/1 R |
| 9,821,393 | B2 | * | 11/2017 | Su ......................... B23G 9/003 |
| 2008/0085490 | A1 | | 4/2008 | Jabri |

FOREIGN PATENT DOCUMENTS

| | | | |
|---|---|---|---|
| DE | 19828691 | A1 | 12/1999 |
| DE | 20022301 | U1 | 7/2001 |
| EP | 2532458 | A1 | 12/2012 |
| FR | 1256805 | A * | 3/1961 ............ B23B 5/167 |
| JP | H02272224 | A | 11/1990 |
| WO | 2004016393 | A1 | 2/2004 |

OTHER PUBLICATIONS

Chinese Office Action dated Jan. 3, 2017 issued in connection with Chinese Patent Application No. 201480042467.0.

Australian Examination Report No. 1 dated Jul. 25, 2017 in connection with Australian Application No. 2014274023.

Office Action dated Feb. 6, 2018 in connection with Japanese Patent Application No. 2016-517021.

* cited by examiner

DEBURRING TOOL

CROSS-REFERENCE TO RELATED APPLICATIONS

This application is a continuation of International Application No. PCT/US2014/040096 having a filing date of May 29, 2014, entitled "Deburring Tool", which claimed priority benefits from U.S. provisional patent application Ser. No. 61/956,039 filed on May 31, 2013, also entitled "Deburring Tool". The '096 international application and the '039 provisional application are each hereby incorporated by reference herein in its entirety.

FIELD OF THE INVENTION

The present invention relates to deburring tools. In particular, the present invention relates to a tool that can be attached to a handheld drill and used to deburr bar stock.

BACKGROUND OF THE INVENTION

Burrs, raised or frayed edges of material often result from machining operations such as grinding, drilling, milling, engraving, and turning. In many cases, it is necessary or preferred to remove these burrs, a process known as deburring, as the presence of burrs can lead to increased wear on the parts involved, leading to frequent replacement, or even preventing the parts from working as intended.

Burrs formed in drilled holes can cause fastener and material problems. Burrs can lead to concentrated stress at the edges of holes, thereby decreasing the material's resistance to fracture. Burrs also increase the friction and heat between moving parts. In addition, burrs can interfere with the proper placement of fasteners, and can also lead to corrosion. Furthermore, the sharp edges of many burrs tend to concentrate electric charge and can lead to spontaneous electronic discharge.

One technique for removing burrs, known as manual deburring, involves the use of a handheld tool, such as a power drill, to remove the burrs. The tool can be a file, grinding disk, grinding stone, grinding tool, sand paper, or the like which is used to file down the burrs. Manual deburring is often time and labor intensive.

In many instances, deburring accounts for a large amount of manufacturing costs. In addition to manual deburring, there are currently several deburring processes including: mass-finishing, spindle finishing, media blasting, sanding, grinding, wire brushing, abrasive flow machining, electrochemical deburring, electropolishing, thermal energy method, machining, and cryogenic. Unfortunately these processes are either expensive, messy, and/or require large equipment.

What is needed is a way to deburr that is more efficient than current manual deburring methods, but does not require the expensive equipment and/or materials of today's current deburring processes such as mill bastard files, grinders, and sanders. It would also be beneficial if this method could be conducted solely using a handheld power drill, without the need of a vice.

SUMMARY OF THE INVENTION

A deburring tool is designed to be used in a handheld power drill and reduces or eliminates the need for cumbersome tools and equipment. The deburring tool can reduce the time spent deburring and increase efficiency in the work place and in the field.

The deburring tool is configured to make dressing the end cut of bar stock resulting from manufacturing, machining or milling. Furthermore the deburring tool performs in a wide range of applications including, but not limited to, anchors, bolts, fasteners, pins, and rods, tubing and pipes and other devices manufactured, machined, or milled from bar stock.

In some embodiments the deburring tool is a solid machined tool cut from a solid tool steel bar, although other materials can be handled as well. The deburring tool has a cone-shaped chamber and a number of flutes with a cutting edge determined by the size of the tool and its particular use. The length, size and shape of the flutes and the cutting edge can also be configured to the size of the cone chamber and its designed application. The conical shape of the cutting chamber accommodates bar stock of various sizes and shapes. For example, the same conical-shaped deburring tool described herein could accept for deburring threaded cylindrical bar stock of varying diameters, such as one-eighth inch (0.3175 centimeters) and one-fourth inch (0.635 centimeters).

In some embodiments, the proportions of the cone body, the cone tool face, the flutes, the flute cutting edge, the internal chamfer, the external chamfer, the radius, the relief portion of the flute, the cone base, the tool shaft portion, the shaft grip surface and the relief cut for tool engagement are engineered to make the tool convenient to use with a handheld drill.

In a preferred embodiment, a deburring tool comprises a hollow top portion having an interior conical surface and an exterior surface. The top portion has a plurality of flutes formed therein, which extend between the interior and exterior surfaces. Each of the flutes has a cutting edge formed at the interior conical surface. In operation, rotation of the deburring tool about a longitudinal axis removes burrs projecting from bar stock contacting the interior conical surface.

The exterior surface of the deburring tool is preferably conical. The top portion preferably has three flutes formed therein. Each of the flutes is preferably offset from the top portion longitudinal axis by 0.050 inch (0.127 cm). The cutting edge and the interior conical surface preferably form an angle between 10 and 20 degrees.

The deburring tool preferably further comprises a tool shaft portion extending downwardly from the hollow top portion. The tool shaft portion is preferably configured for attachment to a drill. The tool shaft portion is preferably hexagonal in cross-section.

The deburring tool is preferably configured to deburr bar stock having a cross-sectional profile selected from group consisting of round, square, triangular, rectangular, pentagonal, hexagonal, heptagonal and octagonal. The deburring tool is preferably configured to deburr bar stock having an exterior surface conformation selected from group consisting of smooth, threaded, knurled, knobby, pocked and serrated.

The deburring tool is preferably formed of steel.

A preferred method of deburring bar stock comprises:
(a) rotating a deburring tool about a longitudinal axis, the deburring tool comprising a hollow top portion having an interior conical surface and an exterior surface, the top portion having a plurality of flutes formed therein and extending between the interior and exterior surfaces, each of the flutes having a cutting edge formed at the interior conical surface; and (b) contacting the bar stock to the deburring tool interior conical surface.

DETAILED DESCRIPTION OF PREFERRED EMBODIMENT(S)

Figure 1:
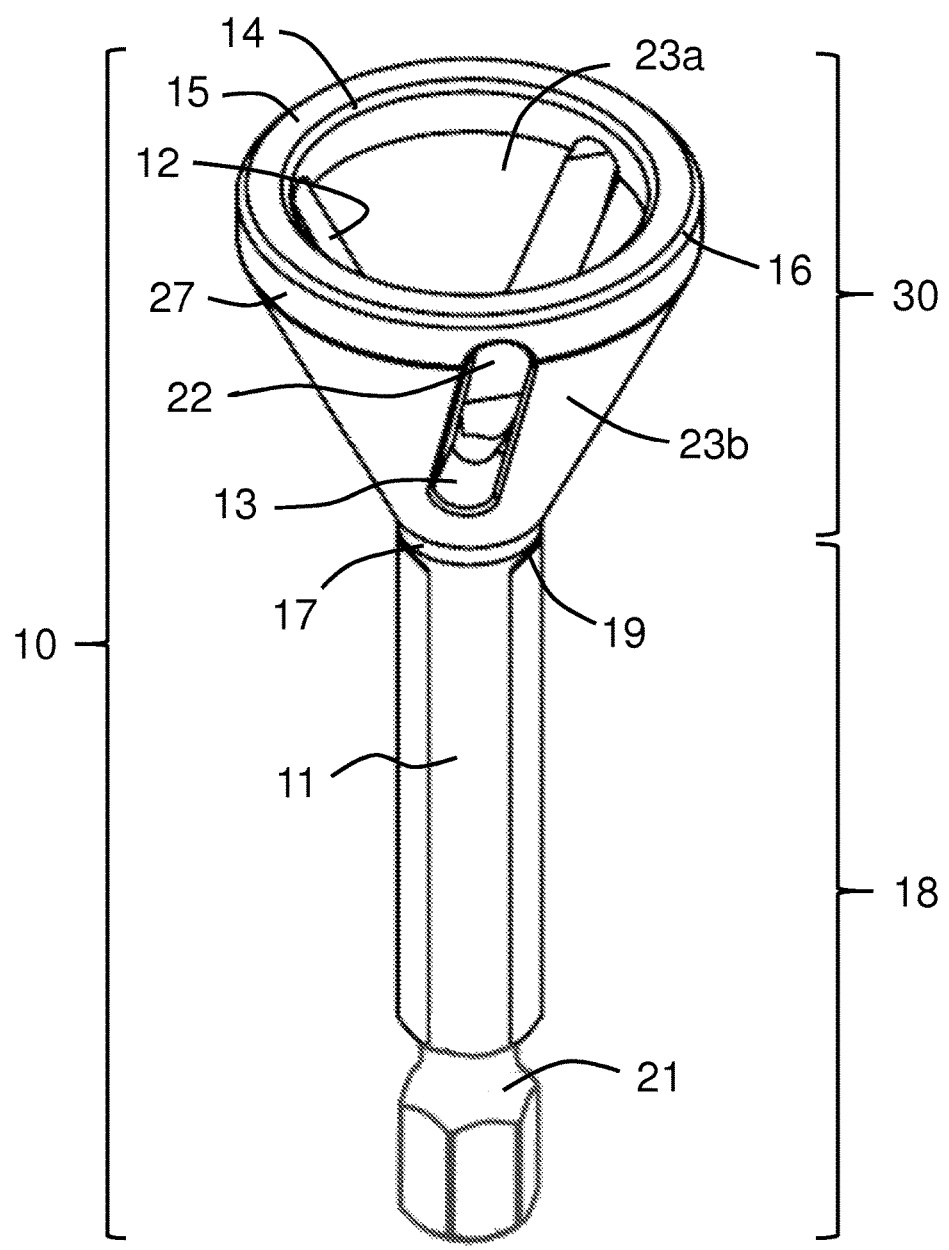
FIG. 1 is a front perspective view of the present deburring tool.

FIG. 1 shows a perspective view of deburring tool 10. Deburring tool 10 has tool shaft portion 18 and conical top portion 30.

Conical top portion 30 is made up of internal cone surface 23a and external cone surface 23b which are capped by tool face 15. Tool face 15 is connected to internal cone body 23a and external cone body 23b via internal chamfer 14 and external chamfer 16, respectively. A collar portion 27 interconnects external chamfer 16 and external cone body 23b.

Conical top portion 30 has formed therein at least one flute 13 having at least one cutting edge 12. Conical top portion 30 also has at least one relief portion 22 associated with flute 13. In the particular embodiment shown, conical top portion 30 has three flutes 13. However, other embodiments can employ various numbers of flutes 13 with corresponding cutting edges 12 and relief portions 22, depending upon the nature of the bar stock to be deburred.

Conical top portion 30 attaches to tool shaft portion 18 at junction 17. In some embodiments, conical top portion 30 need not be perfectly conical. For example, external cone surface 23b could extend outwardly in quasi-cylindrical fashion, so long as flutes 13 remained open between internal surface 23a and external surface 23b such that deburred material from the work piece ejects away from deburring tool 10.

Tool shaft portion 8 includes shaft grip surface 11, shown as being hexagonally shaped in FIG. 1, to allow for convenient handling and attachment. A rounded portion 19 is formed at the upper end of each shaft grip surface 11. Tool shaft portion 18 can also have a relief portion 21 which is configured to connect the deburring tool 10 with a power drill (not shown).

When in use, deburring tool 10 is connected to a drill and rotates either counter-clockwise (or clockwise) depending on the nature of the bar stock being deburred and the configuration of flutes 13. Cutting edge 12 then cuts the burrs from the end of the bar stock.

In one example, the bar stock is a continuous threaded rod that contains a number of burrs remaining from a prior cutting operation. In operation, interior cone surface 23a of deburring tool 10 faces the end of the rod with the burrs to be removed. Deburring tool 10 deburrs the threaded rod without damaging the threads, so that a nut can be spun onto the rod without further preparation.

Figure 2:
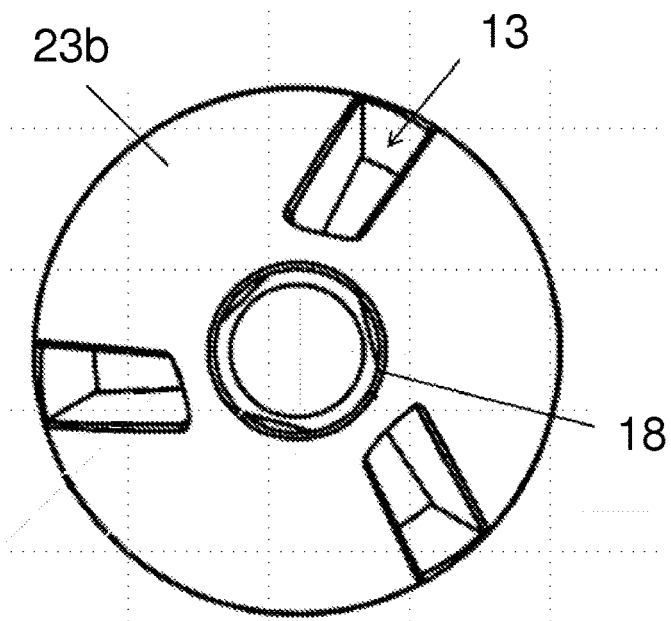
FIG. 2 is a bottom view of the deburring tool of FIG. 1.
Figure 3:
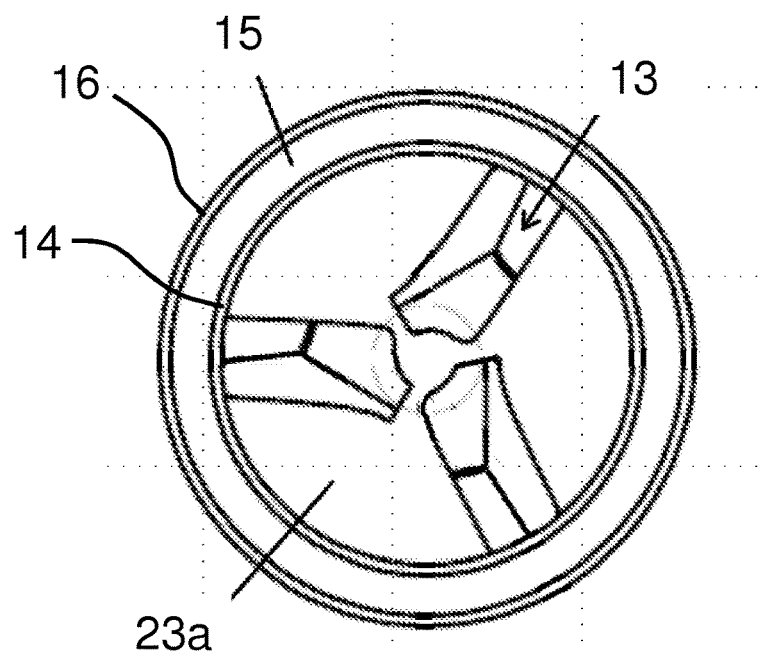
FIG. 3 is a top view of the deburring tool of FIGS. 1 and 2.

FIGS. 2 and 3 show bottom and top views, respectively, of deburring tool 10, as described above with respect to FIG. 1.

Figure 4:
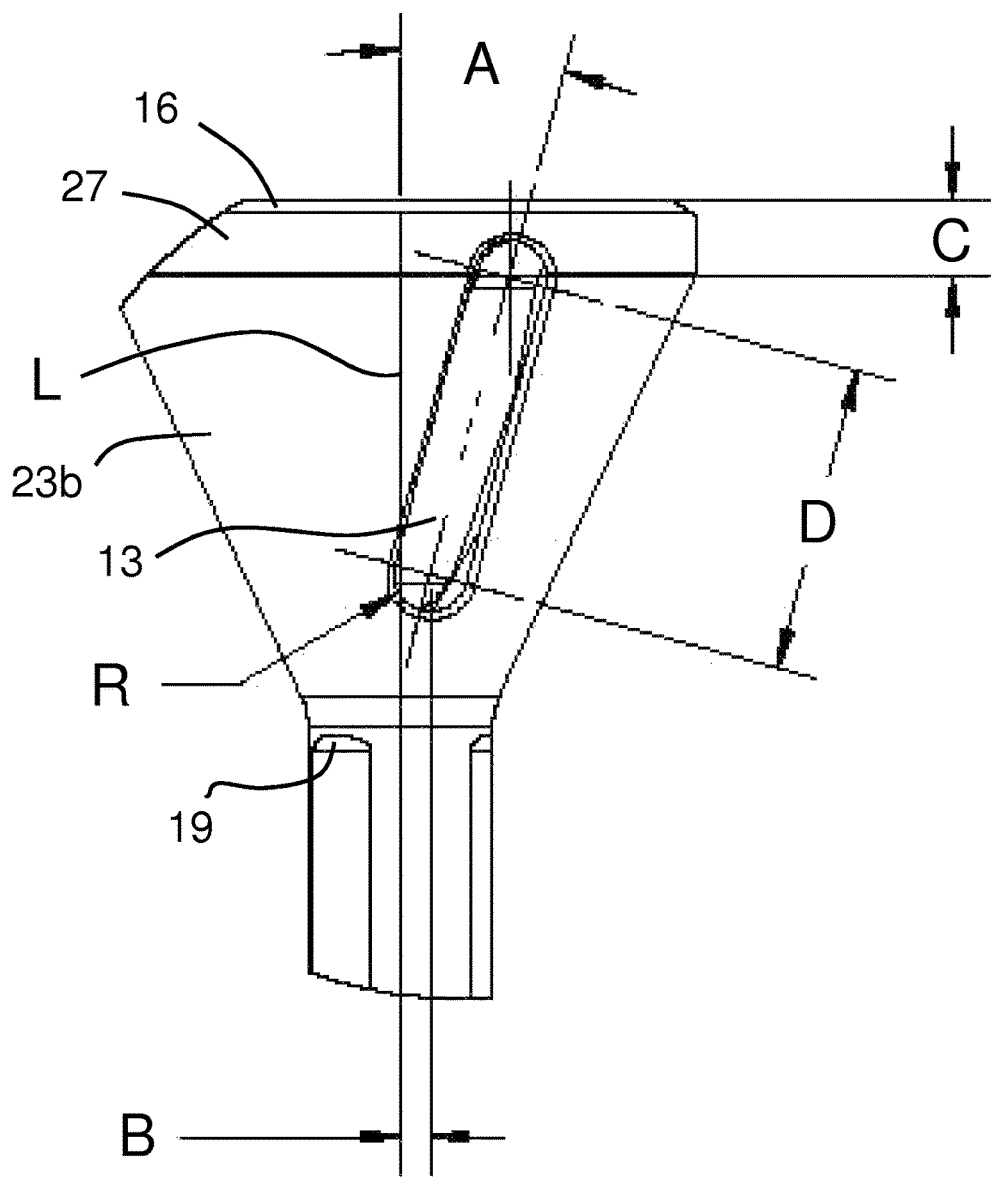
FIG. 4 is a side view of the deburring tool of FIGS. 1-3 depicting the offset of the flutes from the longitudinal of the shaft and the angle of the flutes.

FIG. 4 shows deburring tool 10 with flute 13, which forms a flute angle A with respect to longitudinal axis L of tool shaft portion 18. FIG. 4 also depicts flute 13 positioned a distance defined by flute offset B from longitudinal axis L. Distance C is the distance between tool face 15 and the junction of collar portion 27 and external cone body 23b. In a preferred embodiment, distance C is approximately 0.130 inch (0.330 centimeters). Distance R is the radial distance of each of the oppositely disposed semicircular portions of flute 13. In a preferred embodiment, distance R is preferably approximately 0.063 inch (0.160 centimeters). Distance D is the distance between the center points of the oppositely disposed semicircular portions of flute 13. In a preferred embodiment, distance D is approximately 0.520 inch (1.321 centimeters).

In preferred embodiments, flute angle A is approximately 10-20 degrees from vertical A. Flute offset B is approximately 0.030-0.050 inch (0.076-0.127 centimeter) off-center from the longitudinal axis of shaft portion 8. Forming deburring tool 10 with these measurements makes it easier to use deburring tool 10 with a hand drill, as tool 10 will only bite 0.0015 inch (0.0038 centimeter) per revolution. This amount of bite is conducive for using deburring tool solely with a power drill and without the use of a vice to secure the bar stock.

In preferred embodiments, flute angle A is the same for each of flutes 13, and flute offset B is the same for each of flutes 13.

Table 1 sets forth experimental data with performance characteristics of deburring tool 10 using various measurements for flute angle A and flute offset B.

TABLE 1

| Flute Angle | Flute Offset (inch/cm) | Result |
| --- | --- | --- |
| 10° | 0.000/0.000 | Substantial pressure required; small chips produced; work material hardening occurred |
| 10° | 0.020/0.051 | Substantial pressure required; small chips produced |
| 10° | 0.040/0.102 | Substantial pressure required; moderate size chips produced |
| 15° | 0.020/0.051 | Medium pressure required; small chips produced |
| 15° | 0.040/0.102 | Medium pressure required; insufficient material removed |
| 15° | 0.050/0.127 | Little pressure required to hold work piece; work piece does not twist out of hand; free milling |
| 15° | 0.060/0.152 | Little pressure required; work piece twists in hand; bearing surface minimal |
| 20° | 0.000/0.000 | Moderate pressure required; small chips produced; work material hardening occurred |
| 20° | 0.020/0.051 | Less pressure required; small chips produced |
| 20° | 0.040/0.102 | Less pressure required; grabs work; small bearing surface |

While particular elements, embodiments and applications of the present invention have been shown and described, it will be understood, that the invention is not limited thereto since modifications can be made without departing from the scope of the present disclosure, particularly in light of the foregoing teachings.

What is claimed is:

1. A deburring tool comprising:
    (a) a hollow top portion having an interior conical surface and a conical exterior surface, said top portion having a tool face, a longitudinal axis and exactly three flutes formed therein, said flutes extending between said interior and exterior surfaces, each of said flutes has an oblong configuration with oppositely disposed semicircular top and bottom end portions wherein the distance between the center point of each of said semicircular top end portions and the center point of each of said semicircular bottom end portions is approximately 0.520 inch (1.321 centimeters), each of said semicircular top end portions terminate the same distance from said tool face, each of said semicircular bottom end portions terminate the same distance from said tool face, each of said flutes having a cutting edge formed at said interior conical surface, said cutting edge forming an angle between 10 and 20 degrees as measured from said longitudinal axis of said deburring tool;

(b) a tool shaft portion configured for attachment to a drill extending downwardly from said hollow top portion, said shaft portion having a longitudinal axis coextensive with said top portion longitudinal axis, whereby rotation of said deburring tool about said longitudinal axis removes burrs projecting from bar stock contacting said interior conical surface.

2. The deburring tool of claim 1, wherein each of said semicircular bottom end portion of said flutes has a center of curvature that is offset from said top portion longitudinal axis by 0.050 inch (0.127 cm).

3. The deburring tool of claim 1, wherein said tool shaft portion is hexagonal in cross-section.

4. The deburring tool of claim 1, wherein said deburring tool is configured to deburr bar stock having a cross-sectional profile selected from group consisting of round, square, triangular, rectangular, pentagonal, hexagonal, heptagonal and octagonal.

5. The deburring tool of claim 1, wherein said deburring tool is configured to deburr bar stock having an exterior surface conformation selected from group consisting of smooth, threaded, knurled, knobby, pocked and serrated.

6. The deburring tool of claim 1, wherein said deburring tool is formed of steel.

7. A method of deburring bar stock comprising:
(a) rotating a deburring tool about a longitudinal axis, said deburring tool comprising:
   (i) a hollow top portion having an interior conical surface and an exterior conical surface, said top portion having a tool face, a longitudinal axis and exactly three flutes formed therein, said flutes extending between said interior and exterior surfaces, each of said flutes has an oblong configuration with oppositely disposed semicircular top and bottom end portions wherein the distance between the center point of each of said semicircular top end portions and the center point of each of said semicircular bottom end portions is approximately 0.520 inch (1.321 centimeters), each of said semicircular top end portions terminate the same distance from said tool face, each of said semicircular bottom end portions terminate the same distance from said tool face, each of said flutes having a cutting edge formed at said interior conical surface, said cutting edge forming an angle between 10 and 20 degrees as measured from said longitudinal axis of said deburring tool;
   (ii) a tool shaft portion configured to attach said deburring tool to a drill extending downwardly from said hollow top portion, said shaft portion having a longitudinal axis coextensive with said top portion longitudinal axis; and
(b) contacting said bar stock to said deburring tool interior conical surface.

8. The method of claim 7, wherein each of said semicircular bottom end portion of said flutes has a center of curvature that is off set from said top portion longitudinal axis by 0.050 inch (0.127 cm).

9. The method of claim 7, wherein said tool shaft portion is hexagonal in cross-section.

10. The method of claim 7, wherein said deburring tool is configured to deburr bar stock having a cross-sectional profile selected from group consisting of round, square, triangular, rectangular, pentagonal, hexagonal, heptagonal and octagonal.

11. The method of claim 7, wherein said deburring tool is configured to deburr bar stock having an exterior surface conformation selected from group consisting of smooth, threaded, knurled, knobby, pocked and serrated.

12. The method of claim 7, wherein said deburring tool is formed of steel.

13. A deburring tool formed of steel consisting of:
(a) a hollow top portion having an interior conical surface and an exterior conical surface, said top portion having:
   (i) a tool face;
   (ii) a longitudinal axis; and
   (iii) exactly three flutes formed therein extending between said interior and exterior surfaces, each of said flutes has an oblong configuration with oppositely disposed semicircular top and bottom end portions wherein the distance between the center point of each of said semicircular top end portions and the center point of each of said semicircular bottom end portions is 0.520 inch (1.321 centimeters), each of said semicircular top end portions terminate the same distance from said tool face, each of said semicircular bottom end portions terminate the same distance from said tool face, each of said semicircular bottom end portions having a center of curvature that is offset from said top portion longitudinal axis by 0.050 inch (0.127 cm), each of said flutes having a cutting edge formed at said interior conical surface, said cutting edge forming an angle between 10 and 20 degrees as measured from said longitudinal axis of said deburring tool;
(b) a tool shaft portion extending downwardly from said hollow top portion configured for attachment to a drill, said tool shaft portion is hexagonal in cross-section, said shaft portion having a longitudinal axis coextensive with said top portion longitudinal axis, whereby rotation of said deburring tool about said longitudinal axis removes burrs projecting from bar stock contacting said interior conical surface.

14. The deburring tool of claim 13, wherein said deburring tool is configured to deburr bar stock having a cross-sectional profile selected from group consisting of round, square, triangular, rectangular, pentagonal, hexagonal, heptagonal and octagonal.

15. The deburring tool of claim 13, wherein said deburring tool is configured to deburr bar stock having an exterior surface conformation selected from group consisting of smooth, threaded, knurled, knobby, pocked and serrated.

\* \* \* \* \*